United States Patent
Sankaran et al.

(10) Patent No.: US 11,062,497 B2
(45) Date of Patent: Jul. 13, 2021

(54) STRUCTURALIZED CREATION AND TRANSMISSION OF PERSONALIZED AUDIOVISUAL DATA

(71) Applicant: AT&T Intellectual Property I, L.P., Atlanta, GA (US)

(72) Inventors: Karthiksundar Sankaran, Johns Creek, GA (US); Mauricio Lopez, Decatur, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/651,307

(22) Filed: Jul. 17, 2017

(65) Prior Publication Data

US 2019/0019322 A1    Jan. 17, 2019

(51) Int. Cl.
| | |
|---|---|
| G06T 13/00 | (2011.01) |
| G06T 13/80 | (2011.01) |
| H04L 12/58 | (2006.01) |
| H04L 29/06 | (2006.01) |
| G06F 3/16 | (2006.01) |

(Continued)

(52) U.S. Cl.
CPC .............. *G06T 13/80* (2013.01); *G06F 3/165* (2013.01); *G06T 11/60* (2013.01); *H04L 51/10* (2013.01); *H04L 67/22* (2013.01); *H04L 67/42* (2013.01); *H04N 21/242* (2013.01); *H04N 21/25883* (2013.01); *H04N 21/25891* (2013.01); *H04N 21/26258* (2013.01); *H04N 21/8456* (2013.01);

(Continued)

(58) Field of Classification Search
None
See application file for complete search history.

(56) References Cited

U.S. PATENT DOCUMENTS 6,745,163 B1 * 6/2004 Brocious ................ G10L 13/00
704/260
7,080,315 B1 * 7/2006 Lucas ................ H04M 3/4938
715/201

(Continued)

FOREIGN PATENT DOCUMENTS

| CN | 104200405 A | 12/2010 |
|---|---|---|
| CN | 104915199 A | 9/2015 |
| CN | 105592166 A | 5/2016 |

OTHER PUBLICATIONS

Yan et al.; "Application of HTML5 Multimedia"; IEEE Int'l Conf. on Computer Science and Information Processing; 2012; p. 871-874.

(Continued)

*Primary Examiner* — Anh-Tuan V Nguyen
(74) *Attorney, Agent, or Firm* — BakerHostetler LLP

(57) ABSTRACT

A method and system for creation of an audiovisual message that is personalized to a recipient. Information is received that is associated with the recipient. At least one representation of a visual media segment, including an animation component, and at least one representation of an audio media segment for use in creation of the audiovisual message is identified in memory storage. The information is added to at least one of the visual media segment and the audio media segment. The audio media segment is generated as an audio file. The audio file is synchronized to at least one transition in the animation component. The audio file is associated with the visual media segment.

20 Claims, 7 Drawing Sheets

(51) Int. Cl.
  *G06T 11/60* (2006.01)
  *H04N 21/242* (2011.01)
  *H04W 4/12* (2009.01)
  *H04N 21/262* (2011.01)
  *H04L 29/08* (2006.01)
  *H04N 21/258* (2011.01)
  *H04N 21/845* (2011.01)
  *H04N 21/8549* (2011.01)

(52) U.S. Cl.
  CPC .......... *H04N 21/8549* (2013.01); *H04W 4/12* (2013.01); *H04L 67/02* (2013.01)

(56) References Cited

U.S. PATENT DOCUMENTS

| | | | | |
|---|---|---|---|---|
| 9,798,712 | B2* | 10/2017 | Xu | G06F 40/58 |
| 9,936,229 | B1* | 4/2018 | Wagenaar | H04N 21/23412 |
| 9,992,556 | B1* | 6/2018 | Price | H04N 1/212 |
| 10,175,933 | B1* | 1/2019 | Wagner | G06F 3/167 |
| 2001/0020954 | A1* | 9/2001 | Hull | G06F 17/30038 |
| | | | | 715/730 |
| 2004/0254792 | A1* | 12/2004 | Busayapongchai | |
| | | | | H04M 3/4938 |
| | | | | 704/260 |
| 2005/0185918 | A1* | 8/2005 | Lowe | H04N 7/17318 |
| | | | | 386/228 |
| 2006/0136556 | A1* | 6/2006 | Stevens | H04H 20/10 |
| | | | | 709/203 |
| 2008/0005130 | A1* | 1/2008 | Logan | G06Q 30/06 |
| 2008/0005656 | A1* | 1/2008 | Pang | G09B 5/062 |
| | | | | 715/203 |
| 2008/0183578 | A1* | 7/2008 | Lipscomb | G06Q 30/02 |
| | | | | 705/14.69 |
| 2009/0044112 | A1* | 2/2009 | Basso | G06T 13/205 |
| | | | | 715/706 |
| 2009/0228784 | A1* | 9/2009 | Drieu | G06F 17/214 |
| | | | | 715/235 |
| 2011/0119058 | A1* | 5/2011 | Berard | G11B 27/034 |
| | | | | 704/235 |
| 2011/0154197 | A1* | 6/2011 | Hawthorne | G06Q 30/02 |
| | | | | 715/704 |
| 2011/0239119 | A1* | 9/2011 | Phillips | G06F 16/7834 |
| | | | | 715/731 |
| 2012/0254454 | A1 | 10/2012 | Margush et al. | |
| 2013/0067052 | A1* | 3/2013 | Reynolds | H04L 67/02 |
| | | | | 709/223 |
| 2013/0093773 | A1* | 4/2013 | DeRoller | G06Q 30/0251 |
| | | | | 345/467 |
| 2013/0147913 | A1* | 6/2013 | Steiner | H04N 21/4788 |
| | | | | 348/43 |
| 2013/0159445 | A1* | 6/2013 | Zonka | G06Q 10/1093 |
| | | | | 709/206 |
| 2014/0098118 | A1 | 4/2014 | Liu et al. | |
| 2014/0122079 | A1* | 5/2014 | Kaszczuk | G10L 13/02 |
| | | | | 704/260 |
| 2014/0208203 | A1* | 7/2014 | Tang | G06F 17/212 |
| | | | | 715/252 |
| 2014/0222894 | A1 | 8/2014 | Gangadharan et al. | |
| 2015/0052219 | A1 | 2/2015 | Staudinger et al. | |
| 2015/0052496 | A1* | 2/2015 | Helms | G06F 8/34 |
| | | | | 717/109 |
| 2015/0106225 | A1* | 4/2015 | Glass | G06Q 20/12 |
| | | | | 705/26.7 |
| 2015/0269629 | A1* | 9/2015 | Lo | G06Q 30/0269 |
| | | | | 705/14.66 |
| 2015/0286739 | A1 | 10/2015 | Xie | |
| 2015/0287403 | A1* | 10/2015 | Holzer Zaslansky | |
| | | | | G06T 13/205 |
| | | | | 704/231 |
| 2015/0301721 | A1* | 10/2015 | Clark | H04L 67/10 |
| | | | | 715/780 |
| 2015/0382042 | A1* | 12/2015 | Wagenaar | H04N 21/26258 |
| | | | | 725/34 |
| 2016/0006946 | A1* | 1/2016 | Cohen | G06F 19/326 |
| | | | | 348/660 |
| 2016/0011868 | A1* | 1/2016 | Frenkiel | G06F 8/73 |
| | | | | 717/123 |
| 2016/0026730 | A1* | 1/2016 | Hasan | G06F 17/30896 |
| | | | | 715/234 |
| 2016/0134755 | A1* | 5/2016 | Carlson | H04M 3/5233 |
| | | | | 379/265.12 |
| 2016/0182515 | A1* | 6/2016 | Barraclough | G06F 16/9535 |
| | | | | 726/4 |
| 2016/0182977 | A1* | 6/2016 | Mitra | H04N 21/251 |
| | | | | 725/14 |
| 2016/0212501 | A1* | 7/2016 | Master | H04N 21/8133 |
| 2016/0328877 | A1* | 11/2016 | Cui | H04L 51/10 |
| 2017/0003828 | A1* | 1/2017 | Gorman | G06F 3/0481 |
| 2017/0004859 | A1* | 1/2017 | Charumilind | G11B 27/10 |
| 2017/0041372 | A1* | 2/2017 | Hosur | H04N 21/25883 |
| 2017/0062008 | A1* | 3/2017 | Wharton | G11B 27/034 |
| 2017/0062009 | A1* | 3/2017 | Clifton | G06F 40/14 |
| 2017/0201473 | A1* | 7/2017 | Stanek | H04L 51/04 |
| 2017/0212722 | A1* | 7/2017 | Campbell | G06F 3/165 |
| 2018/0036591 | A1* | 2/2018 | King | A63B 24/0075 |
| 2018/0053510 | A1* | 2/2018 | Kofman | G11B 27/031 |
| 2018/0130156 | A1* | 5/2018 | Grau | G06Q 50/2057 |
| 2018/0130496 | A1* | 5/2018 | Mahapatra | G06K 9/00718 |
| 2018/0276296 | A1* | 9/2018 | Gerlach | G06F 16/438 |
| 2019/0014063 | A1* | 1/2019 | Melenboim | H04L 51/10 |
| 2019/0076741 | A1* | 3/2019 | Thompson | A63F 13/828 |

OTHER PUBLICATIONS

Daoust et al.; "Towards Video on the Web with HTML5"; NEM Summit 6; 2010; 6 pages.
Pfeiffer et al.; "Accessibility for the HTML5 <video> element"; Proceedings of the Int'l Cross-Disciplinary Conf. on Web Accessibility; 2009; 2 pages.

* cited by examiner

STRUCTURALIZED CREATION AND TRANSMISSION OF PERSONALIZED AUDIOVISUAL DATA

FIELD OF INVENTION

This disclosure generally relates to the creation and transmission of media, and, more particularly, to structuralized creation and transmission of personalized media to client devices.

BACKGROUND

Computing devices are commonly used to consume video media. Video is created in one location, or on one device, and then streamed to another location or device in real time. Alternatively, video may be created on one device and sent to another device for storage and consumption at a later time. Such video may be used for entertainment or other uses. For example, video files may be used to provide instruction or education.

In such cases, it may be desirable for video to be targeted, or personalized, to recipients of the video. For example, the seller of a product may want to provide personalized instruction videos to its customers. A personalized video may refer to purchasers by name and offer targeted instructions based on the educational level of the purchaser. Such personalized videos would serve to enhance the customer experience.

A technological barrier exists, however, in that the creation and transmission of personalized videos for consumption by a large number of end users is expensive and resource intensive. Personalized video content takes time to author, film, edit, and produce. This translates to high production costs. Furthermore, video files are large. Creating a large number of videos requires a correspondingly large amount of storage space and bandwidth to transmit, which is also expensive. Accordingly, there is a problem in that current technology does not provide a way to produce personalized video messages at a scale that would make it reasonable and cost effective to employ in the prior contexts. Therefore, what is needed is structuralized creation and transmission of personalized audiovisual data.

SUMMARY

In embodiments, non-transitory computer readable media can store instructions for performing or causing aspects disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and system for creation of an audiovisual message that is personalized to a recipient are provided. Information is received that is associated with the recipient. At least one representation of a visual media segment, including an animation component, and at least one representation of an audio media segment for use in creation of the audiovisual message is identified in memory storage. The information is added to at least one of the visual media segment and the audio media segment. The audio media segment is generated as an audio file. The audio file is synchronized to at least one transition in the animation component. The audio file is associated with the visual media segment. In one embodiment, the step of receiving comprises receiving an indication from an analytics engine of an identified need of the recipient. In one embodiment, identifying comprises identifying at least one of the representation of the visual media segment and representation of the audio media segment in accordance with the identified need. In one embodiment, the text based representation of the audio media segment is an audio transcript. In one embodiment, the representation of the video media segment is an HTML5 file. In one embodiment, the HTML5 file includes at least one cascading style sheet (CSS) animation. In one embodiment, the step of synchronizing the audio file comprises matching the audio file to transitions in CSS animation.

BRIEF DESCRIPTION OF THE DRAWINGS

Aspects of the herein described systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, the same numbers refer to the same elements throughout.

DETAILED DESCRIPTION

Figure 1A:
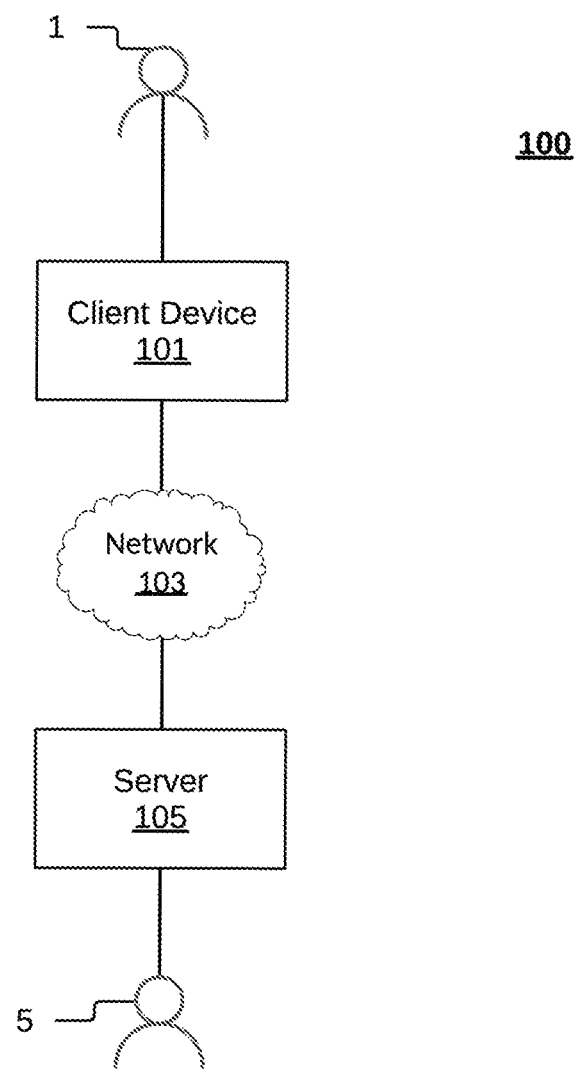
FIG. 1A illustrates an exemplary system for creating and transmitting personalized audiovisual media to a client device.

Referring to FIG. 1A, an exemplary system 100 for creation and transmission of personalized data is provided for illustrative purposes.

System 100 in one embodiment comprises at least one instance of client device 101, at least one instance of network 103, and at least one instance of server 105. An illustrative embodiment of a hardware that may be used for client device(s) 101 and/or server(s) 105 is provided in FIG. 4.

Figure 3:
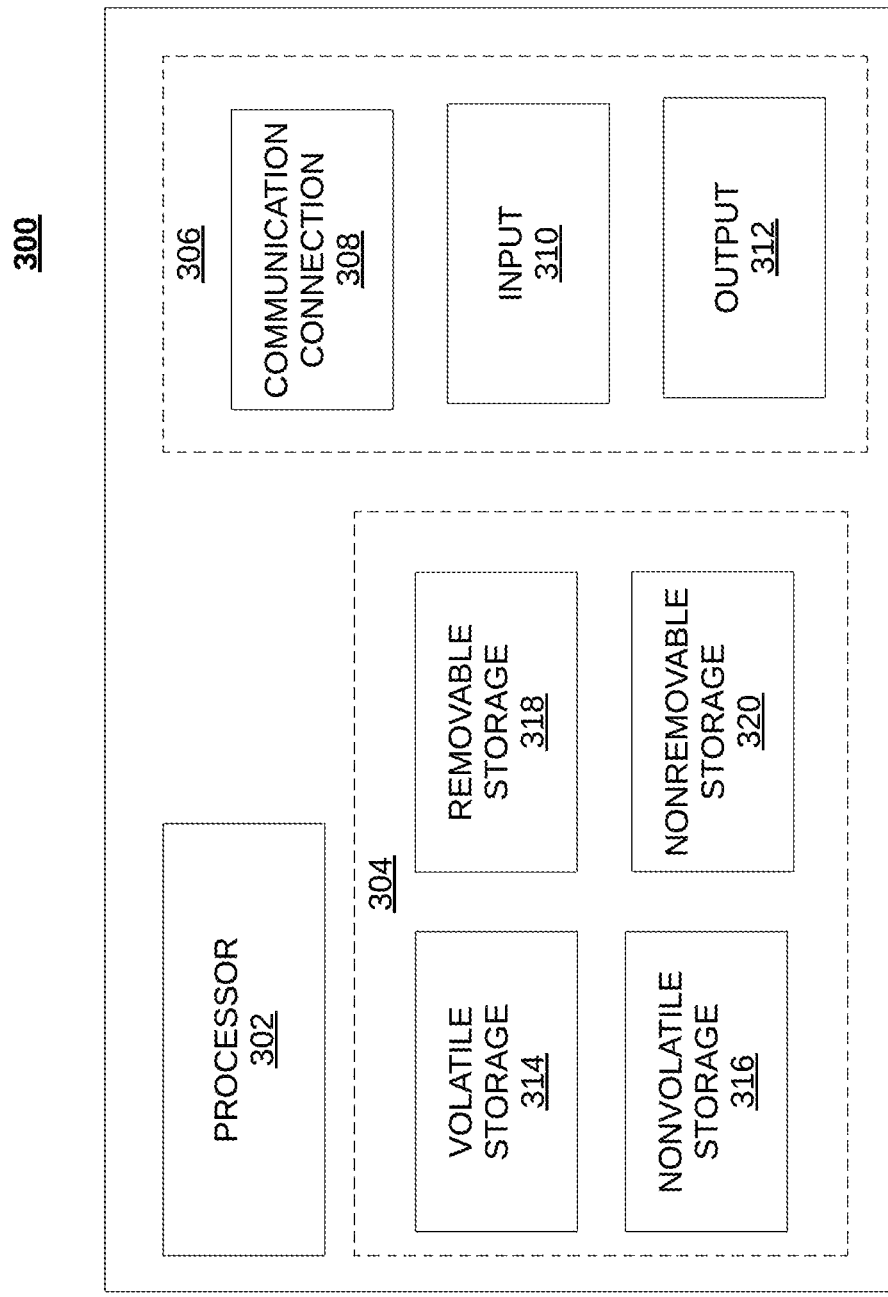
FIG. 3 depicts an exemplary hardware embodiment for one or more components of FIG. 1.

Network 103, in one example, may be a fixed network, e.g., Ethernet, Fiber, ISDN, PLC, or the like or a wireless network, e.g., WLAN, cellular, or the like, or a network of heterogeneous networks. For example, the network 103 may comprise multiple access networks that provide content, such as voice, data, video, messaging, broadcast, or the like to multiple users. For example, the network 103 may employ one or more channel access methods, such as code division multiple access (CDMA), time division multiple access (TDMA), frequency division multiple access (FDMA), orthogonal FDMA (OFDMA), single-carrier FDMA (SC- FDMA), and the like. Further, the communication network 103 may comprise other networks such as a core network, the Internet, a sensor network, an industrial control network, a personal area network, a fused personal network, a satellite network, a home network, or an enterprise network for example. An illustrative embodiment of hardware that may be used for a component of network 103 is shown in FIG. 3.

Client device 101 in one example is operated by at least one or more users 1 who may consume media from one or more providers 5. Provider(s) 5 will operate one or more servers 105 to provide products, services, information, and data to user(s) 1. A user 1 will utilize a client device 101 to establish contact with server(s) 105 over one or more network(s) 103. A user 1 in one example may request personalized audiovisual data from server 105, and server 105 will create and transmit the desired personalized audiovisual data to user device 101, over one or more networks 103, in accordance with the principles described herein. In another example, server 105 may identify certain information to send to a user 1. Server 105 may create the content of a message to include such information and may push it, or send it, as personalized audiovisual media to client device 101 over one or more networks 103. The depiction of a single user 1, a single client device 101, a single network 103, a single provider 5, and a single server 105 is provided for illustrative purposes only. It should be understood that there may be a plurality of each of these entities.

Provider 5, in one example, may want to provide personalized media to user 1 in connection with a good or service. For instance, provider 5 may sell a good and may send personalized messages to user 1, which provide information related to the good. Examples include, but are not limited to, instruction manuals, promotional material, upgrade information, recall announcements, service information, maintenance information, and the like. Provider 5, in another instance, may sell a service, and provider may send personalized messages to user 1, which provide information relating to the service. Examples include, but are not limited to, welcome information, activation information, billing information (e.g. reminders), and the like. The preceding examples are provided for illustrative purposes and not to limit the scope of the disclosure.

Referring further to FIG. 1A, user device 101, network 103, and/or server 105 may be implemented as standalone hardware comprised of various hardware components or a combination of hardware and/or software components. User device 101 and/or server 105 may also be implemented as one or more virtualized functions implemented on general purpose hardware, in lieu of having dedicated hardware perform their various functions. That is, general purpose hardware may be configured to run virtual elements to support the functionality described herein. Furthermore, it is noted that the software and hardware components described herein may be combined and/or divided without departing from the scope of the present disclosure.

Figure 1B:
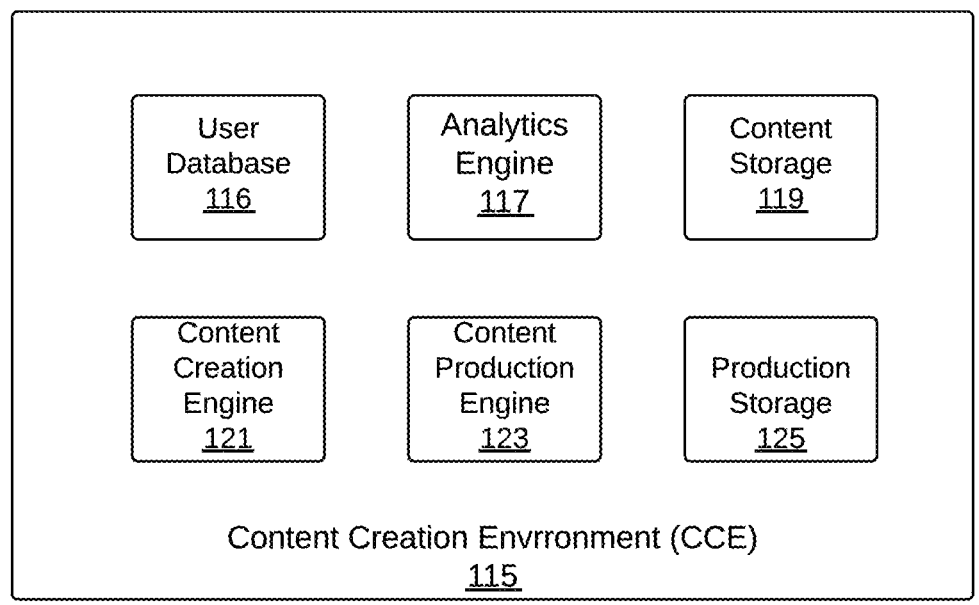
FIG. 1B illustrates an exemplary content creation environment for use in the system of FIG. 1.

Referring to FIG. 1B, a functional diagram of one embodiment of a content creation environment (CCE) 115 is provided for illustrative purposes. CCE 115 in one example comprises a user database 116, analytics engine 117, a content creation engine 119, a content production engine 121, content storage 123, and production storage 125.

User database 116 in one embodiment comprises one or more memory devices that include information about user(s) 1. User information may include, but not be limited to, biographical information, demographic information, financial information, health information, vehicular telematics information, personal telematics information, customer relationship management data, and the like. User information may include information relating to products and/or services that user 1 uses or consumes, such as products and services that user 1 may obtain from provider 5 or from a third party.

Analytics engine 117, in one embodiment, comprises a data analytics engine that analyzes user information. Analytics engine 117 in one example may be implemented as a set of business rules operating on a processor. In another example, analytics engine 117 may utilize machine learning and/or artificial intelligence programs operating on a processor. Analytics engine 117 identifies or determines data or information that may be worthwhile for provider 5 to send to user 1 in one or more personalized AV messages. In one example, analytics engine 117 may analyze information from user database 116. In another example, analytics engine 117 may analyze information that it retrieves from other systems of provider 5 or from third party sources over one or more networks 103. In another example, analytics engine 117 may analyze information that it retrieves from user database 116 and other sources over network(s) 103.

Examples of content that analytics engine 117 may identify are now provided for illustrative purposes:

In one example, provider 5 may sell a device, such as a mobile phone, a tablet device, or a computer. User database 116 may include information indicating that user 1 just received the device, but has not activated a service corresponding to the device. Analytics engine 117 may determine that it would be worthwhile to send a personalized audiovisual welcome message to user 1 that provides instructions on how to use the device and activate the service. In one example, analytics engine 117 may determine that the user 1 is a certain age or educational level and therefore tailor the video to the user's 1 age and/or educational level. For instance, if user 1 is 25 years old and has previously activated a cellular telephone service, the welcome message may contain less instruction, than if user 1 is 12 years old or has never previously owned a mobile device In another example, one user 1 may gift a product to another user 1. When the product is delivered to the other user, the analytics engine 117 may detect a notification from a shipping company that the product has been received by the other user 1. The analytics engine 117 may determine that it should provide a personalized audiovisual gift message to the second user 1. The analytics engine 117 may identify content within user database 116 to create the personalized audiovisual message. Alternatively, analytics engine 117 may cause server 105 to request information from the first user 1 to create the personalized audiovisual message.

In another example, analytics engine 117 may determine that user 1 may have to make a service payment of some sort to provider 5 or to a third party. Analytics engine 117 may determine user 1 may be late in making such payment based on financial information (e.g. bank balances, payment patterns, etc.) of user 1. Analytics engine 117 may determine that it would be desirable to send a personalized audiovisual reminder message to user 1.

In another example, analytics engine 117 may analyze purchase patterns or life events of user 1. Based on this information, analytics engine 117 may determine that user 1 may be likely to purchase a product and/or service from provider 5 or another party. Analytics engine 117 may determine that it would be desirable to send a personalized promotional audiovisual message to user 1 promoting the product and/or service.

Referring further to FIG. 1B, in one embodiment, content storage 119 includes content that may be utilized to create a personalized AV message. In one example, such content may be pre-created content. Such pre-created content in one example may include transcripts of potential audio content to be used in a personalized audiovisual message. These transcripts may include placeholders where personalized content may be inserted. In one example, content storage 119 may include visual content that may be used in a personalized AV message. The video content may be pre-created. For instance, the visual content may be one or more prepared storyboards. In one example, the storyboards may be written in a language used for presenting visual content over the web. For example, storyboards may be written in hypertext markup language 5 (HTML5) utilizing cascading style sheets 3 (CSS3) animation content. In one example, the storyboards may include placeholders where personalized content may be inserted.

Figure 1C:
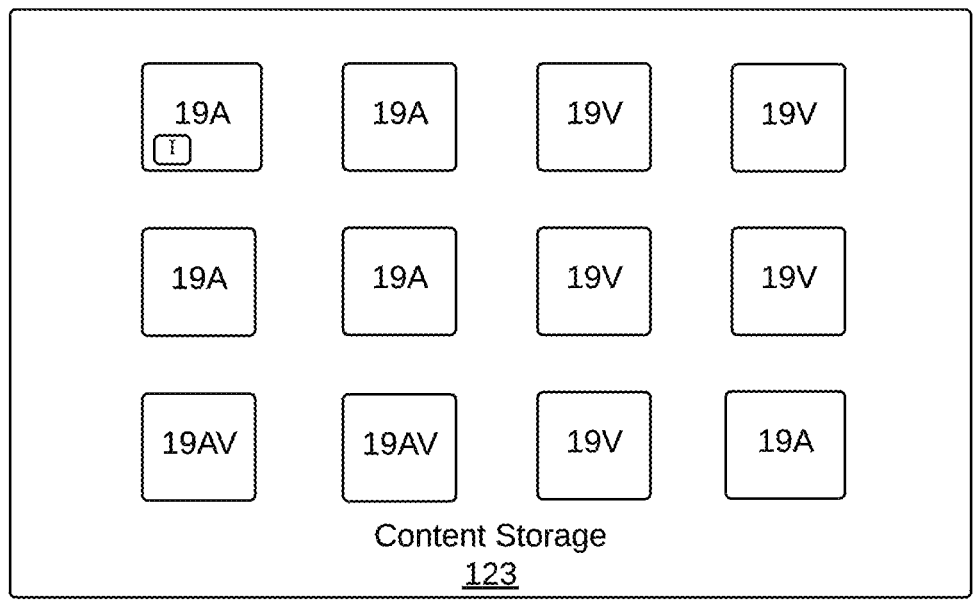
FIG. 1C illustrates an exemplary content storage space for use in the content creation engine of FIG. 1B.

Referring to FIG. 1C, in one example, content storage 119 comprises a memory device holding a plurality of content segments 19. Content segments 19 may include one or more audio content segments 19A and one or more visual content segments 19V. Content segments 19 may also include one or more audio and visual content segments 19AV. Audio content segments 19A and video content segments 19V may be combined to produce one or more audiovisual content segments 19AV.

In one embodiment, one or more content segments 19 may have an index I that it utilized to identify and retrieve content segments 19. Index I may be an identifier or pointer that provides an indicator of the content or appropriate use case for a content segment 19. In addition, index I may include information to assist CCE 115 in placing content segments 19 in an appropriate sequence. For example, a content segment 19 directed at a gift message may include an index I with information indicating that the content segment 19 is appropriate for a gift message. It may also include information indicating that it is a greeting or a salutation. If the content segment 19 is a visual content segment 23, the index I may indicate that it is a visual content segment 23. The index I may also provide information as to the personalization information required to complete the content segment 19.

In another embodiment, content segments 19 may not include an index I. Content segments 19 may be searched using text or image search tools to identify content. The appropriate use for the content may be determined using analytic tools. For instance, this may be desirable in the case in which content segments 19 are stored for later use. It may be more efficient to store such previously used content segments 19 in raw form rather than index them immediately. After the appropriate use for a content segment 19 is determined, an index I may be added to the content segment 19.

In one embodiment, content segments 19 may be combined, divided, and arranged in accordance with the desired content of a personalized audiovisual message. As an example, CCE 115 may determine that a particular personalized AV message is desirable to send to user 1. Audio segments A1 and A3, visual segments V1 and V3 and a portion of visual segment V2 may be determined as appropriate to create the message. Accordingly, CCE 115 will select A1, A3, V1, V3, and the portion of V2 to utilize in the assembly of the personalized audiovisual message.

Referring now to FIG. 1B, content creation engine 121 in one embodiment selects the content that is used to create the personalized AV message. For instance, content creation engine 121 may search the content of the content storage 119 to identify relevant segments 19 to utilize in creating an audiovisual message. Content creation engine 121 may select certain segments 19 (or portions thereof) as described above and assemble the selected segments 19 into a prospective personalized audiovisual message or message segment. Content creation engine 121 may review the proposed message (or segment) and identify personalization information that is needed for the audiovisual message (or segment). Content creation engine 121 may test the proposed message to verify that it meets certain criteria. For instance, content creation engine 121 may determine whether or not the prospective message is grammatically correct or is appropriately sequential. Content creation engine 121 may determine whether the prospective message is an appropriate length. For instance, it may not be desirable for a product promotional message to last beyond a predetermined length of time because doing so may have an adverse effect on converting the message into a purchase. If content creation engine 121 determines that the prospective message does not meet certain predetermined criteria, it may discard some segments 19 and select new segments 19. An iterative process may occur until the personalized audiovisual message meets certain criteria.

Figure 2A:
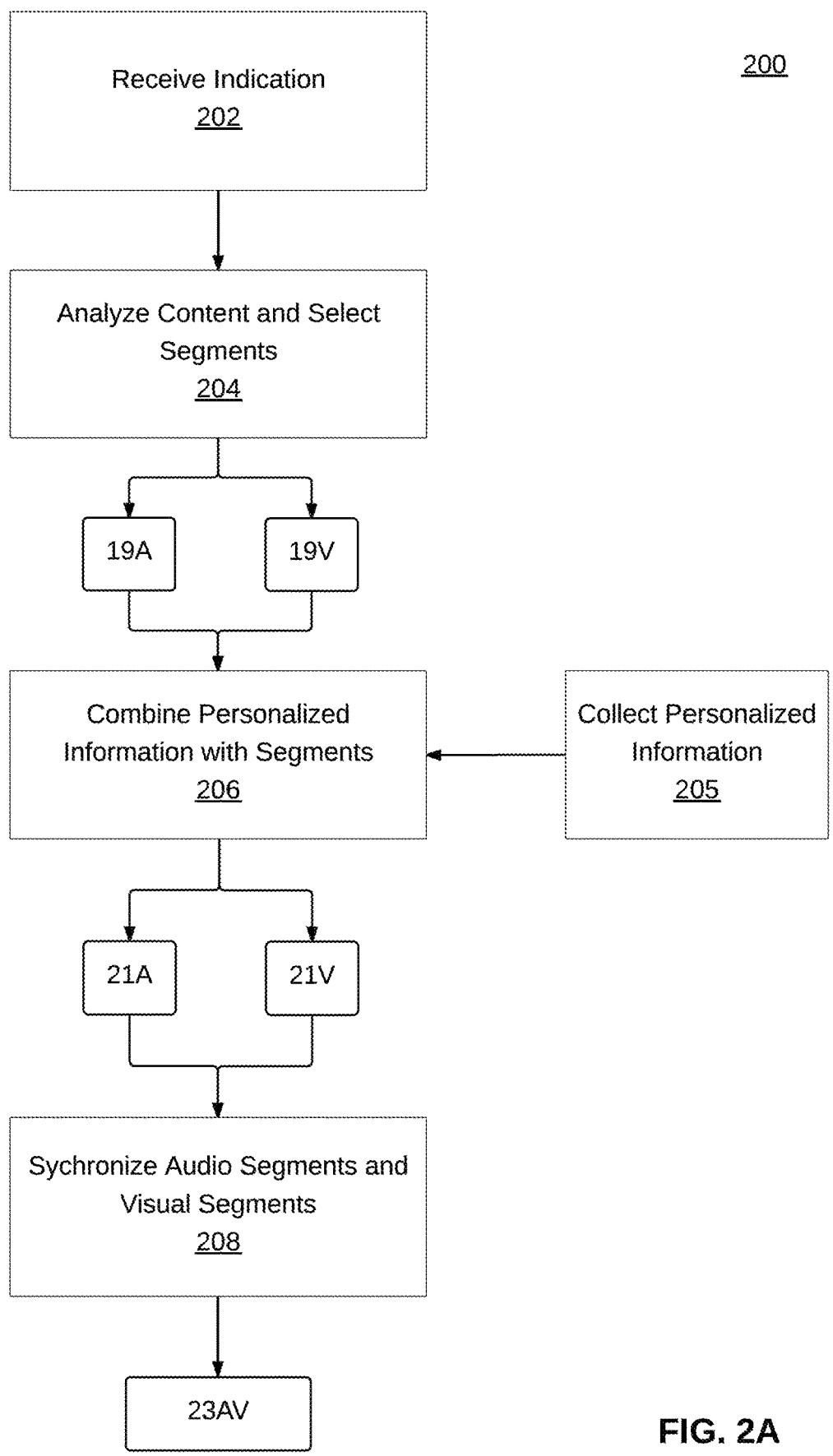
FIG. 2A illustrates a content creation engine for use in the content creation environment (CCE) of FIG. 1B.

Referring now to FIG. 2A, a description of a process 200 by which content creation engine 121 utilizes segments 19 and personalized content to create a personalized audiovisual message segment is now described for illustrative purposes.

In one embodiment, in step 202 content creation engine 121 receives an indication of a type of personalized audiovisual message that provider 5 wants to send to a user 1. The indication may originate from a user 1, from provider 5, from a provider system, from analytics engine 117, from a user 1, from another part of server 105, from another system of provider 5, or from a third party system. The indication may be a notification of a request for a particular personalized audiovisual message or it may be the request itself. The indication may also be an internally generated indication. For example, analytics engine, based on information from one or more sources, may determine that a personalized audiovisual message should be sent to a user 1.

In step 204, content creation engine 121 analyzes content storage 119, as discussed in connection with FIG. 1C, to identify one or more segments 19 to utilize in creation of the personalized AV message. Content creation engine 121 in one example selects at least one audio segment 19A and at least one visual segment 19V. Content creation engine 121 may identify personalized content that may be combined with segments 19A, 19V to complete a personalized AV message. Content creation engine 121 may use placeholders within segments 19A, 19V that identify personalized information (PI) that may be added to segments 19A, 19V. In one example, content creation engine 121, in step 205, may collect or receive personalized information from user database 116. In another example, content creation engine 121 may collect or receive personalized information from other sources, such as other systems of provider 5, third party databases, or from one or more users 1. For instance, one user 1 may send a personalized gift message to another user 1, in which case the other user 1 may provide the content of the personalized gift message through a user interface of client device 101 and over network 103 to server 105. The content may be provided in a number of formats, such as audio, visual, and text.

In step 206, upon receipt of the personalized information, the personalized information (PI) and segments 19A, 19V are combined. In one embodiment the personalized information and segments 19A, and 19V are combined through a merge operation. In one example, the personalized information relating to an audio segment 19A is combined with segment 19A to produce a personalized audio segment 21A, and the personalized information relating to video segment 19V is combined with segment 19V to create a personalized video segment 21V. In one embodiment, the personalized information is combined with segments 19A, 19V through utilization of a JavaScript Object Notation (JSON) REST API. The personalization information may be JSON formatted and then combined with segments 19A, 19V utilizing JavaScript. The personalized audio segment 21A may be operated upon by a text to speech engine which will produce an audio file output.

Once the personalized media segments 21A, 21V are created, they are input to a synchronization operation 208. The audio segment 21A is synchronized to the animation in the visual segment 21V. In one example, the audio segment 21A and the visual segment 21V are synchronized through synchronizing the HTML5 content in the visual segment 21 V to the audio segment 21A. The synchronization of audio data to the HTML5 animations in the visual segments will appear on a rendering device as video content. However, files containing HTML5 code and audio data are not as resource intensive to render. Such files can be rendered through a JavaScript player on a web browser. Furthermore, the HTML5/audio files do not require as much storage or bandwidth as video files.

Referring now to FIG. 1B, content production engine 123 in one embodiment is utilized to produce a personalized audiovisual message through utilization of one or more personalized audiovisual segments 23AV created by content creation engine 121.

Figure 2B:
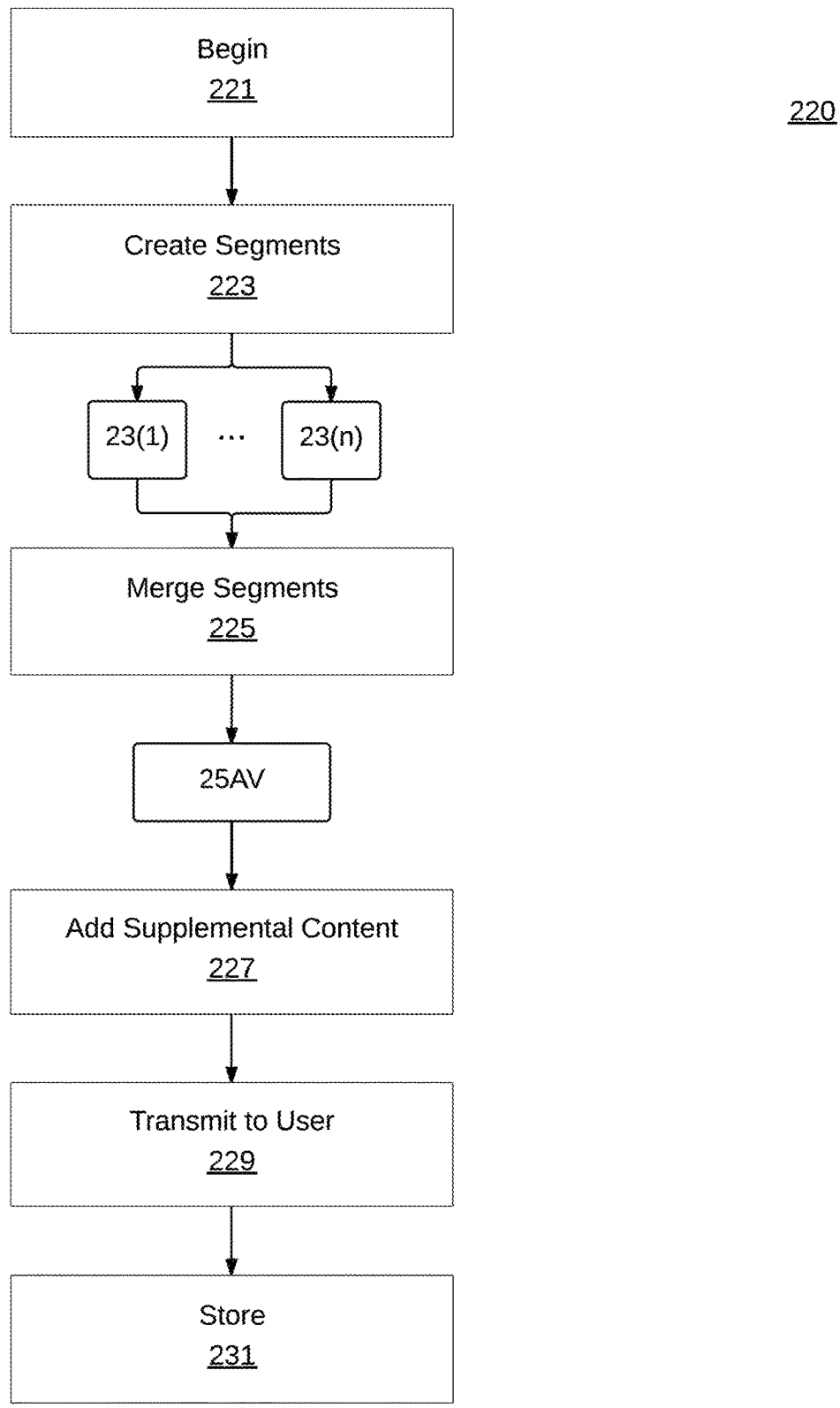
FIG. 2B illustrates a method for producing personalized audiovisual message using the content creation engine of FIG. 1B.

Referring to FIG. 2B, a process 220 for creating a personalized AV message through utilization of multiple segments 23 is now provided for illustrative purposes. In step 221 the process begins. In step 223, AV segments 23(1) . . . 23(n) are created utilizing process 200. In step 225, AV segments 23(1) . . . 23(n) are merged to create a personalized AV message 25; for example, segments 23(1) . . . 23(n) may be merged sequentially or thematically. In step 227, supplemental material may be added. For instance, background music may be added to the message. In another example, tracking information may be added to verify whether or not a user consumed the message or to verify other information, such as where, when, and on what type of equipment, the message was consumed. In step 229, personalized AV message is transmitted client device 101 for consumption by user 1. In one example, the personalized AV message may be stored in CCE (FIG. 1B) before, after, or contemporaneously with it being transmitted to client device 101. In one example, in step 231, the personalized audiovisual message 25AV may be stored in production storage 125 (FIG. 1B). In another embodiment, it may be stored in content storage 119. In another embodiment, it may be stored in another system of provider 5. As was mentioned in connection with process 200, all or a portion of personalized audiovisual message 25AV may be utilized in the creation of another personalized audiovisual message 25AV.

In one embodiment, such another personalized audiovisual message 25AV may be created by using content creation engine 121 to parse personalized audiovisual message 25AV to identify audio segments 19A and/or visual segments 19V that may be useful in the creation of another personalized audiovisual message 25AV. In one example, this may be useful if additional personalized audiovisual messages 25AV are sent to the same user 1 because personalized content would already reside in the personalized audiovisual message 25 AV and would not have to be added again. In another example, it may be useful to use a prior personalized audiovisual message 25AV because it may be a new type of message when it was first used. Accordingly, personalized information could be removed from the segments 23A, 23V and/or replaced with placeholders. In another embodiment, personalized information could be replaced with updated personalized information.

FIG. 3 is a block diagram of network device 300 that may be connected to or comprise a component of system 100. For example, network device 300 may implement one or more portions of methods 200, 220 of FIGS. 2A and 2B. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig- Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
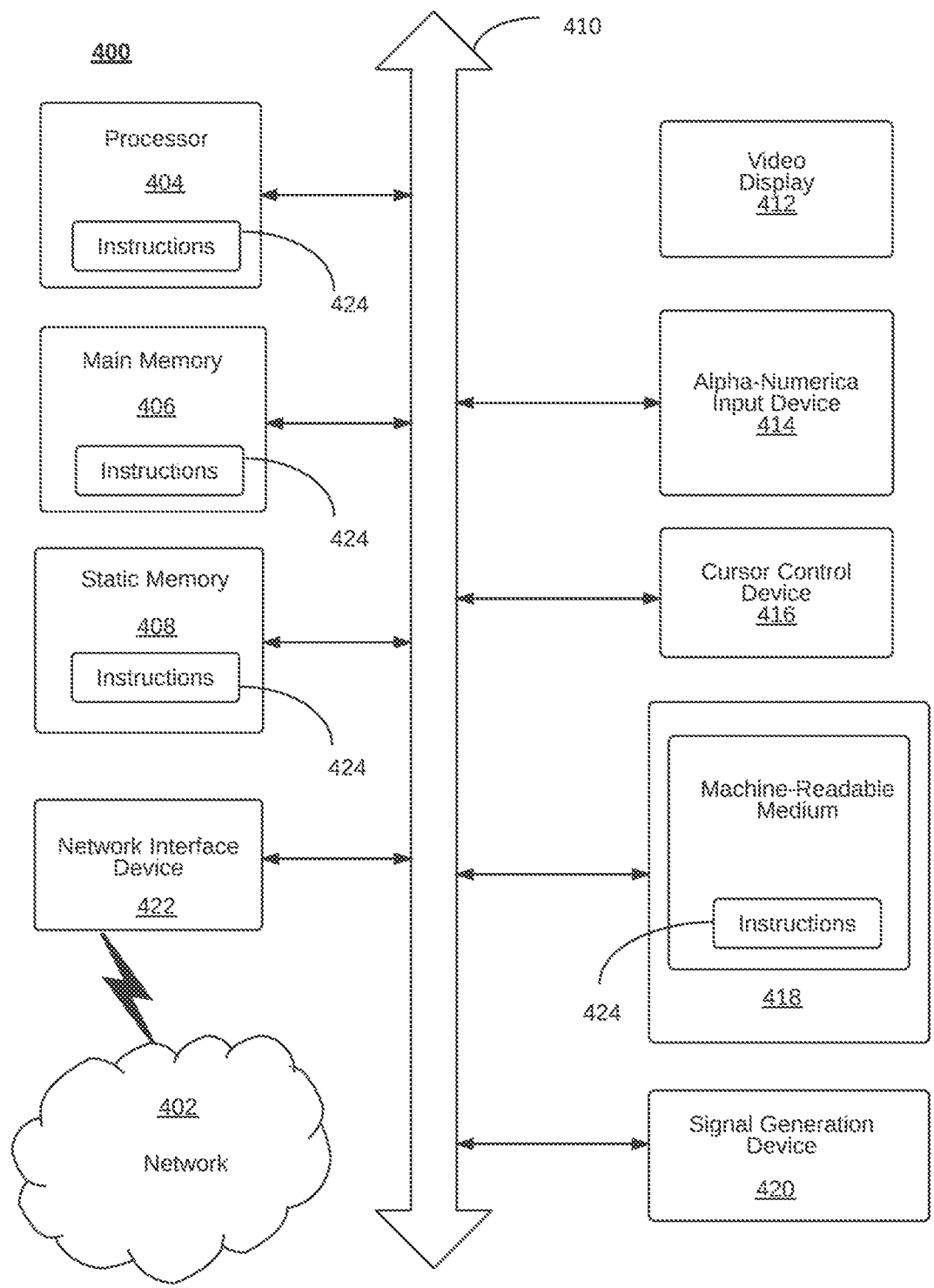
FIG. 4 depicts an exemplary hardware embodiment for one or more components of FIG. 1.

FIG. 4 depicts an exemplary diagrammatic representation of a machine in the form of a computer system 400 within which a set of instructions, when executed, may cause the machine to perform any one or more of the methods described above. One or more instances of the machine can operate, for example, as client device 101, server 105, processor 302 and other devices of FIGS. 1A-1B and 3. In some embodiments, the machine may be connected (e.g., using a network 103) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 400 may include a processor (or controller) 404 (e.g., a central processing unit (CPU)), a graphics processing unit (GPU, or both), a main memory 406 and a static memory 408, which communicate with each other via a bus 410. The computer system 400 may further include a display unit 412 (e.g., liquid crystal display (LCD), a flat panel, or a solid state display). Computer system 400 may include an input device 414 (e.g., a keyboard), a cursor control device 416 (e.g., a mouse), a disk drive unit 418, a signal generation device 420 (e.g., a speaker or remote control) and a network interface device 422. In distributed environments, the embodiments described in the subject disclosure can be adapted to utilize multiple display units 412 controlled by two or more computer systems 400. In this configuration, presentations described by the subject disclosure may in part be shown in a first of display units 412, while the remaining portion is presented in a second of display units 412.

The disk drive unit 418 may include a tangible computer-readable storage medium 424 on which is stored one or more sets of instructions (e.g., software 426) embodying any one or more of the methods or functions described herein, including those methods illustrated above. Instructions 426 may also reside, completely or at least partially, within main memory 406, static memory 408, or within processor 404 during execution thereof by the computer system 400. Main memory 406 and processor 404 also may constitute tangible computer-readable storage media.

While examples of a system 100 have been described in connection with various computing devices/processors, the underlying concepts may be applied to any computing device, processor, or system capable of facilitating a system 100. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for communications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a system 100 as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a system 100 has been described in connection with the various examples of the various figures, it is to be understood that other similar implementations may be used or modifications and additions may be made to the described examples of a telecommunications system without deviating therefrom. For example, one skilled in the art will recognize that a system 100 as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed is:

1. A method to generate a file for execution on a recipient device to produce a personalized audiovisual message, comprising:
    identifying, in a database, personal information related to a user of the recipient device;
    analyzing the personal information to determine information pertinent to the user device;
    using the pertinent information to identify, in a memory storage device, a markup code representation of a visual media segment and a text representation of an audio media segment for use in creation of the personalized audiovisual message;
    integrating the personal information into the markup code representation of the visual media segment and the text representation of the audio media segment such that a first position of the personal information in the markup code representation corresponds to a second position of the personal information in the text representation;
    generating an audio file from the text representation of the audio media segment; and
    associating the audio file with the markup code representation of the visual media segment such that the audio file will be synchronized with the visual media segment when rendered on the recipient device.

2. The method of claim 1, wherein the integrating the personal information comprises using a RESTful application programming interface.

3. The method of claim 2, wherein identifying comprises identifying at least one of the markup code representation of the visual media segment and the text representation of the audio media segment in accordance with an identified need.

4. The method of claim 1, wherein the text representation of the audio media segment comprises an audio transcript.

5. The method of claim 1, wherein representation of the visual media segment comprises an HTML5 file.

6. The method of claim 5, wherein the HTML5 file includes at least one cascading style sheet (CSS) animation.

7. The method of claim 6, further comprising: identifying a transition in the HTML5 file when the visual media segment ends and indicating that the audio file should end at the transition.

8. A system to create a file for execution on a recipient device to create a personalized audiovisual message, including:
    a server operating on a processor and stored on a non-transitory computer readable medium, the server including a content creation engine configured to:
        store personal information, in a database, relating to a user of the recipient device;
        analyze the personal information to determine information, pertinent to the user, to send to the recipient device;
        using the pertinent information to identify, in a memory storage device, at least one markup code representation of a visual media segment and at least one text representation of an audio media segment for use in creation of the personalized audiovisual message;
        integrating the personal information into the markup code representation of the visual media segment and the at least one text representation of the audio media segment such that a first position of the personal information in the markup code representation corresponds to a second position of the personal information in the text representation;
        generate an audio file from the text representation of the audio media segment; and
        associate the audio file with the markup code representation of the visual media segment such that the audio file will be synchronized with the visual media segment when rendered on the recipient device.

9. The system of claim 8, wherein the communication interface is configured to receive an indication from an analytics engine of an identified need of the recipient.

10. The system of claim 9, wherein the content creation engine is configured to identify at least one of the markup code representation of the visual media segment and the text representation of the audio media segment in accordance with the identified need.

11. The system of claim 8, wherein the text representation of the audio media segment is an audio transcript.

12. The system of claim 8, wherein the markup code representation of the visual media segment is an HTML5 file that includes at least one cascading style sheet (CSS) animation.

13. The system of claim 12, wherein the content creation engine is further configured to identify a transition in the CSS animation at a point which the visual media segment ends and to indicate that the audio file should end at the transition.

14. The system of claim 13, wherein the audio file is generated through use of a text to speech engine.

15. A system, including:
    a device including a processor and instructions stored on a non-transitory computer readable medium, the instructions when executed perform a method including:

identifying, in a database, personal information related to a user of the recipient device;

analyzing the personal information to determine information pertinent to the user to send to the recipient device;

using the pertinent information to create at least one of a markup code representation of a visual media segment personalized to the user and a text representation of an audio media segment personalized to the recipient for use in creation of an audiovisual message;

integrating the personal information into the markup code representation of the visual media segment and the text representation of the audio media segment such that a first position of the personal information in the markup code representation corresponds to a second position of the personal information in the text representation;

generating an audio file from the text representation; and associating the audio file with the markup code representation of the visual media segment such that the audio file will be synchronized with the visual media segment when rendered on a device.

16. The system of claim 15, wherein the integrating the personal information comprises using a RESTful application programming interface.

17. The system of claim 16, wherein identifying comprises identifying at least one of the markup code representation of the visual media segment and the text representation of the audio media segment in accordance with an identified need.

18. The system of claim 15, wherein the text representation of the audio media segment comprises an audio transcript.

19. The system of claim 15, wherein the markup code representation of the visual media segment comprises an HTML5 file.

20. The system of claim 19, wherein the HTML5 file includes at least one cascading style sheet (CSS) animation.

* * * * *